United States Patent [19]

Yoshimura

[11] Patent Number: 4,945,210

[45] Date of Patent: Jul. 31, 1990

[54] CARD CONTROLLED SOLDERING IRON TEMPERATURE CONTROL DEVICE

[75] Inventor: Hiroshi Yoshimura, Osaka, Japan

[73] Assignee: Hakko Metal Industries Limited, Osaka, Japan

[21] Appl. No.: 177,696

[22] Filed: Apr. 5, 1988

[30] Foreign Application Priority Data

Nov. 18, 1987 [JP] Japan .......................... 62-176117[U]

[51] Int. Cl.$^5$ ............................................. H05B 1/02
[52] U.S. Cl. .................................... 219/241; 219/501; 219/497; 219/494; 219/506; 235/375; 361/171; 364/477
[58] Field of Search ................. 219/10.55 B, 506, 501, 219/233, 497, 494, 241, 240, 451, 452, 507–509; 235/375, 382; 364/472; 307/117; 361/171

[56] References Cited

U.S. PATENT DOCUMENTS

| | | | |
|---|---|---|---|
| 3,883,716 | 5/1975 | Fortune | 219/242 |
| 4,345,132 | 8/1982 | Takase et al. | 235/375 |
| 4,412,216 | 10/1983 | Mole et al. | 235/382 |
| 4,599,509 | 7/1986 | Silverman et al. | 235/382 |
| 4,684,791 | 8/1987 | Bito | 235/382 |
| 4,746,787 | 5/1988 | Suto et al. | 235/380 |
| 4,792,910 | 12/1988 | Lange | 235/375 |

Primary Examiner—M. H. Paschall
Attorney, Agent, or Firm—Mason, Fenwick & Lawrence

[57] ABSTRACT

A card controlled temperature control device for soldering iron in which only a specific person can set and control the tip temperature of the soldering iron. The device comprises a card having a specific identification code, a card identifier for identifying the idententification code, an input section for entering a set value, a set value judging component for judging if the entered set value is in the allowable range or not, and temperature control circuitry controlling the heater of soldering iron on the basis of the set value within the allowable range, whereby the iron tip temperature is allowed to be set and operated by a specific person having a specific card and its misoperation is prevented.

6 Claims, 5 Drawing Sheets

CARD CONTROLLED SOLDERING IRON TEMPERATURE CONTROL DEVICE

BACKGROUND OF THE INVENTION

1. Field of the Invention

This invention relates to a soldering iron temperature control device for setting and controlling the tip temperature of a soldering iron, and more specifically to a soldering iron temperature control device capable of allowing a specific person only to set the tip temperature and preventing its misoperation.

2. Description of the Prior Art

The assembling work of various electric products using electronic components such as ICs is usually done in the assembling line process, and soldering is included in part of this process.

This soldering job is done manually, and for this job, conventionally, a soldering device comprising a main body a, a temperature scale b indicating the heating temperature of the tip part of the soldering iron (tip temperature), and a control knob c for adjusting the tip temperature by matching with the temperature scale b, as shown in FIG. 5, has been employed widely.

In the soldering operation, the operator properly handles said control knob c depending on the object of soldering to adjust the tip temperature of the soldering iron properly.

In such structure capable of freely adjusting the tip temperature, however, although the tip temperature can be properly raised to increase the job speed, the reliability of the product may be lowered.

That is, since the operator can freely set and change the heating temperature of the tip of the soldering iron, if the job is delayed, the operator can raise the heating temperature beyond the set point by his own judgement, but the product is heated more than necessary, and the quality may be lowered.

Besides, when setting the tip temperature, the operator turns the indicator of the control knob c to the temperature scale c, but if the knob is of variable resistor type as shown in the drawing, slight setting errors cannot be avoided, and where a plurality of soldering devices are installed, the heating temperatures of tips differ slightly from each other. As a result, the product quality is not uniform, and it leads to deterioration of products.

BRIEF SUMMARY OF THE INVENTION

In the light of the above-discussed points of the prior art, it is a primary object of this invention to present a novel soldering iron temperature control device allowing only a specific person to set and change the tip temperature of the soldering iron while solving the above problems.

It is another object of this invention to present a soldering iron temperature control device capable of preventing other persons than a specific person from setting and changing the heating temperature of the tip, wherein a setting card is inserted into a card inlet of the device main body when changing the setting of the tip temperature of the soldering iron, and numerical value cannot be entered unless a specific person is identified, so that a specific person such as specialist only is allowed to operate for setting.

It is a further different object of this invention to present a soldering iron temperature control device capable of effectively preventing deterioration or fluctuation of product quality, by allowing the change of set temperature only within predetermined upper and lower limits to prevent from setting at higher temperature due to misoperation of setting or wrong judgement, thereby maintaining the tip temperature at an optimum temperature for electronic components to be soldered.

In structure, the soldering iron temperature control device of this invention in which the set value of the soldering iron tip temperature is adjustable comprises card means having an identification code to specify a specific temperature setting operator, card identification means for identifying a specific person from the identification code of said card means and delivering a setting permit signal when specific person is identified, input means for entering the set value of said tip temperature on the basis of the setting permit signal of said card identification means, set value judging means for judging if the input numerical value from said input means is within the allowable range of the tip temperature or not, memory means for storing the set value entered through said set value judging means, temperature sensor means for detecting the tip temperature of the soldering iron, comparative means for comparing the detected temperature of the temperature sensor means and the set value in said memory means, and temperature control means for delivering a control signal on the basis of the result of comparison of said comparative means, and heating and controlling the heater of the soldering iron.

These and other objects of the invention as well as the features thereof will be understood and appreciated more clearly from the following detailed description and the appended claims taken in conjunction with the drawings:

DETAILED DESCRIPTION OF THE PREFERRED EMBODIMENTS

A soldering iron temperature control device is composed of, as shown in FIG. 1 to FIG. 4, a device main body 1, a soldering iron 2, and a setting card 3.

Figure 1:
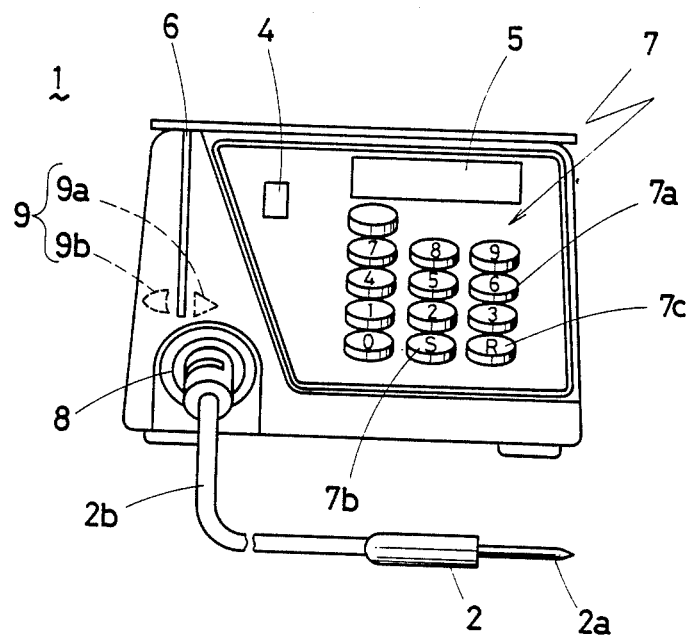
FIG. 1 is a front view showing a soldering iron temperature control device in one of the embodiments of this invention.
Figure 2:
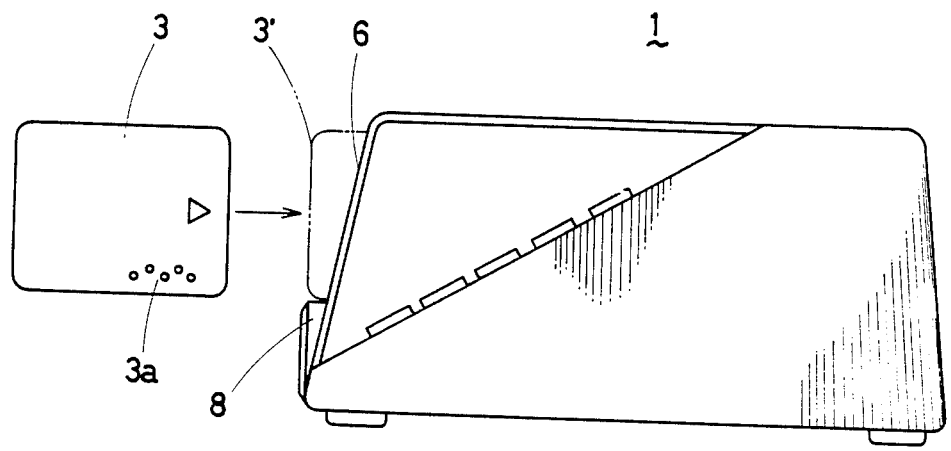
FIG. 2 is a side view of the same temperature control device showing the state of insertion of setting card in the inlet of the device main body.

The device main body 1 is, as shown in FIG. 1 and FIG. 2, shaped in a box form, having a power switch 4, a temperature display window 5 and a temperature setting keyboard 7 disposed on its front panel. In the upper part of the left side of the front panel of the device main body 1, a card inlet 6 for insertion of said setting card 3 is provided, while a plug socket 8 for inserting a plug of lead wire 2b of said soldering iron 2 is disposed at its lower side.

Said soldering iron 2 incorporates a heater 17 (FIG. 3) for heating its tip 2a, and it is connected to said plug socket 8 by way of the plug of the lead wire 2b.

Said setting card 3 is to prove that the cardholder is the specific person allowed to change the set temperature of the temperature control device, and an identification code 3a composed of plural tiny perforated holes is provided in its part as shown in FIG. 2, and the individual identification of the setting card 3 is possible by the arrangement of the holes of the identification code 3a.

The card inlet 6 has an optical identification device 9, which is composed of projector 9a and detector 9b.

The projector 9a and detector 9b are disposed opposite to each other near the identification code 3a of the setting card 3 inserted into the card inlet 6. In the optical identification device 9, when the setting card 3 is inserted into the card inlet 6, the projector 9a emits light to the identification code 3a on the setting card 3, while the light penetrating through the holes in the identification code 3a is detected by the detector 9b, and the detection signal according to the arrangement of holes is delivered to a card identification part 12 of a control circuit (FIG. 3) which is described later.

Said keyboard 7 is for setting the temperature of the tip 2a (tip temperature) of the soldering iron 2, and comprises numeric keys 7a, set switch 7b and reset switch 7c. The keyboard 7 is connected to the card identification part 12 and set value identification part 13 of the control circuit shown in FIG. 3, and output of numerical value by the key operation of the numeric keys 7a is possible on the basis of the permit signal delivered from the card identification part 12.

Figure 3:
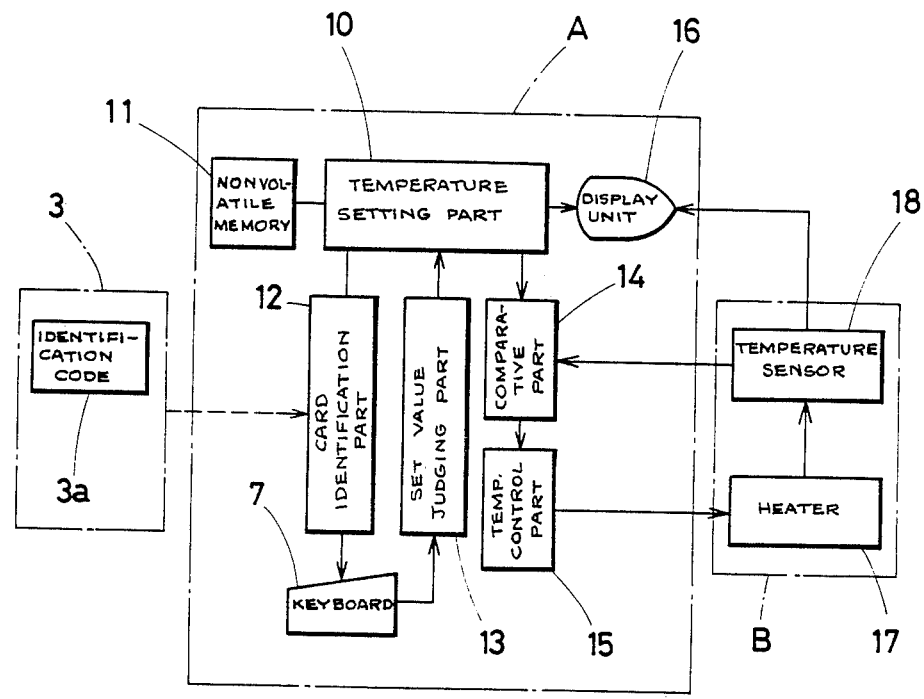
FIG. 3 is a block diagram showing the temperature control circuit of the same temperature control device.

Referring now to the block diagram in FIG. 3, the control circuit of the soldering iron temperature control device is described in details below.

The control circuit of the temperature control device is composed of control block A and soldering iron block B.

The control block A comprises nonvolatile memory 11, card identification part 12, set value judging part 13, comparative part 14, temperature control part 15, and temperature display part 16 connected to a central processing unit (CPU).

The soldering iron block B comprises said heater 17 and temperature sensor 18, and this heater 17 receives a control signal from said temperature control part 15, and heats the tip 2a of the soldering iron 2. The temperature sensor 18 detects the temperature of said heater 17, and delivers it to the comparative part 14 and temperature display part 16.

The nonvolatile memory 11 is for storing the set value of the temperature entered from the keyboard 7, and if the power switch 4 is turned off, the stores set value is kept on, and this set value is sent to said comparative part 14, and is also delivered to the temperature display part 16.

The card identification part 12 is intended to identify if the setting operator is the specified person or not when changing the set value of the tip temperature of the soldering iron 2; that is, when the setting card 3 is inserted into the card inlet 6, the signal delivered from the optical identification device 9 is received, and this signal value is collated with the pre-entered specific person code to judge if the cardholder of setting card 3 is the specific person or not, and a setting permit signal is delivered if judged to be the specific person.

The set value judging part 13 is to judge if the tip temperature set value entered from the keyboard 7 is within the allowable range or not, and in this embodiment it is preset so that the numerical value input signal may be delivered only if the numeric keys 7a are operated in a range of 100° C. to 480° C.

The comparative part 14 is to compare the set value stored in the nonvolatile memory 11 and tip temperature of the soldering iron detected by said temperature sensor 18, and deliver the signal depending on the result of comparison.

The temperature control part 15 is to control the heating temperature of the heater 17, and it receives the output signal from the comparative part 14 and delivers the control signal based on the result of comparison to the heater 17.

The temperature display part 16 indicates the set value in the nonvolatile memory 11 or the temperature detected by the temperature sensor 18 in the display window 5, and in this embodiment, it is designed to display a newly set value for 10 seconds after changing the set temperature of the timer.

In thus composed soldering iron temperature control device, only a specific person is allowed to set the tip temperature of the soldering iron 2.

That is, when changing the tip temperature of the soldering iron 2, as indicated by double-dot chain line in FIG. 2, when the setting card 3 held by the specific person is inserted into the card inlet 6 of the device main body 1, the identification code 3a of the setting card 3 is collated with the pre-entered specific person code in the card identification part 12. When this setting card 3 is identified to belong to the specific person, a setting permit signal is delivered from the card identification part 12, and input of numerical value by key operation on the keyboard 7 is allowed. Thus, the specific setting operator can clear the former temperature stored in the nonvolatile memory 11 and set a new value.

Figure 4A:
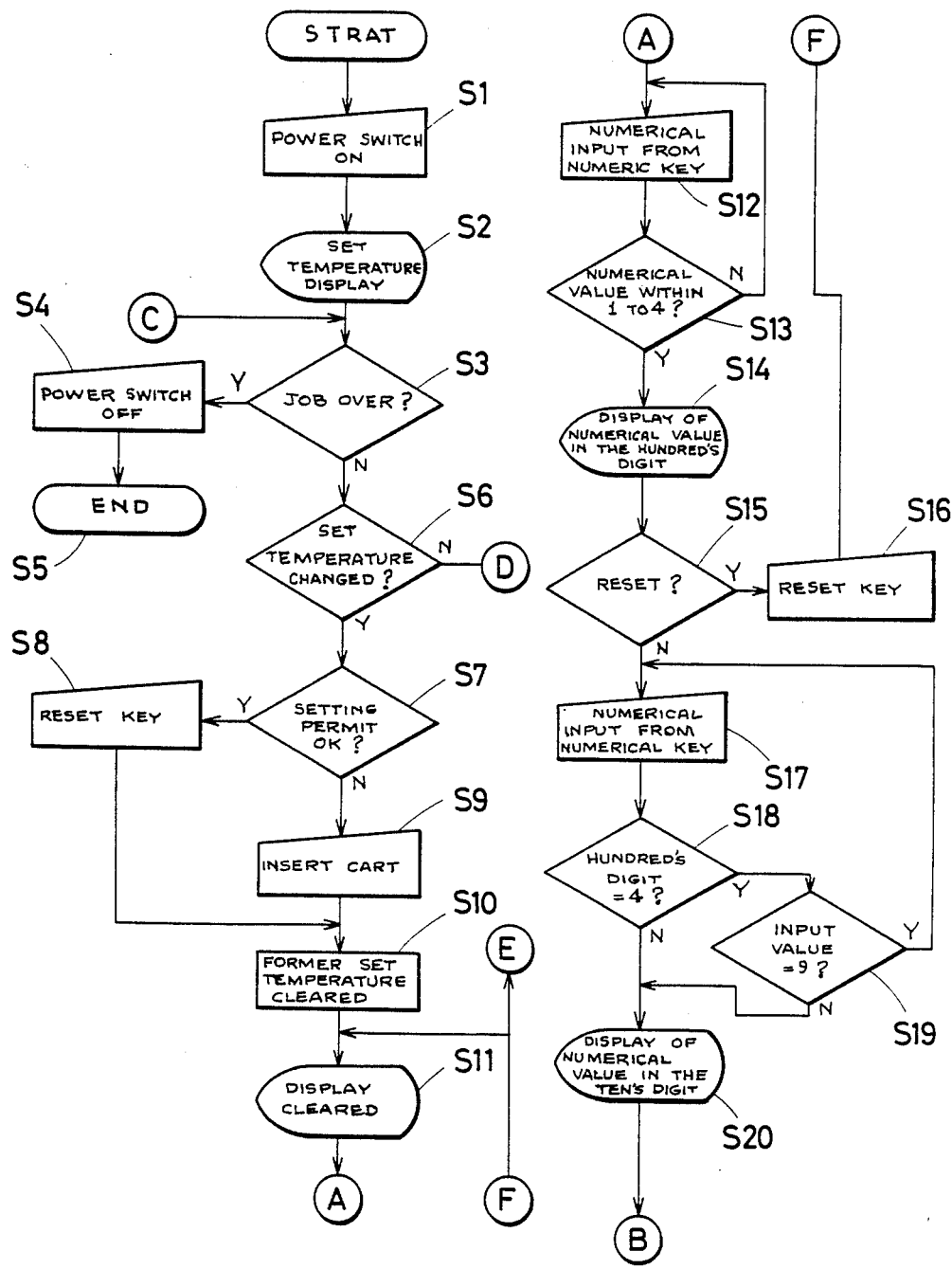
FIG. 4a, FIG. 4b are flowcharts of setting operation of the tip temperature of the soldering iron in the same temperature control device.
Figure 4B:
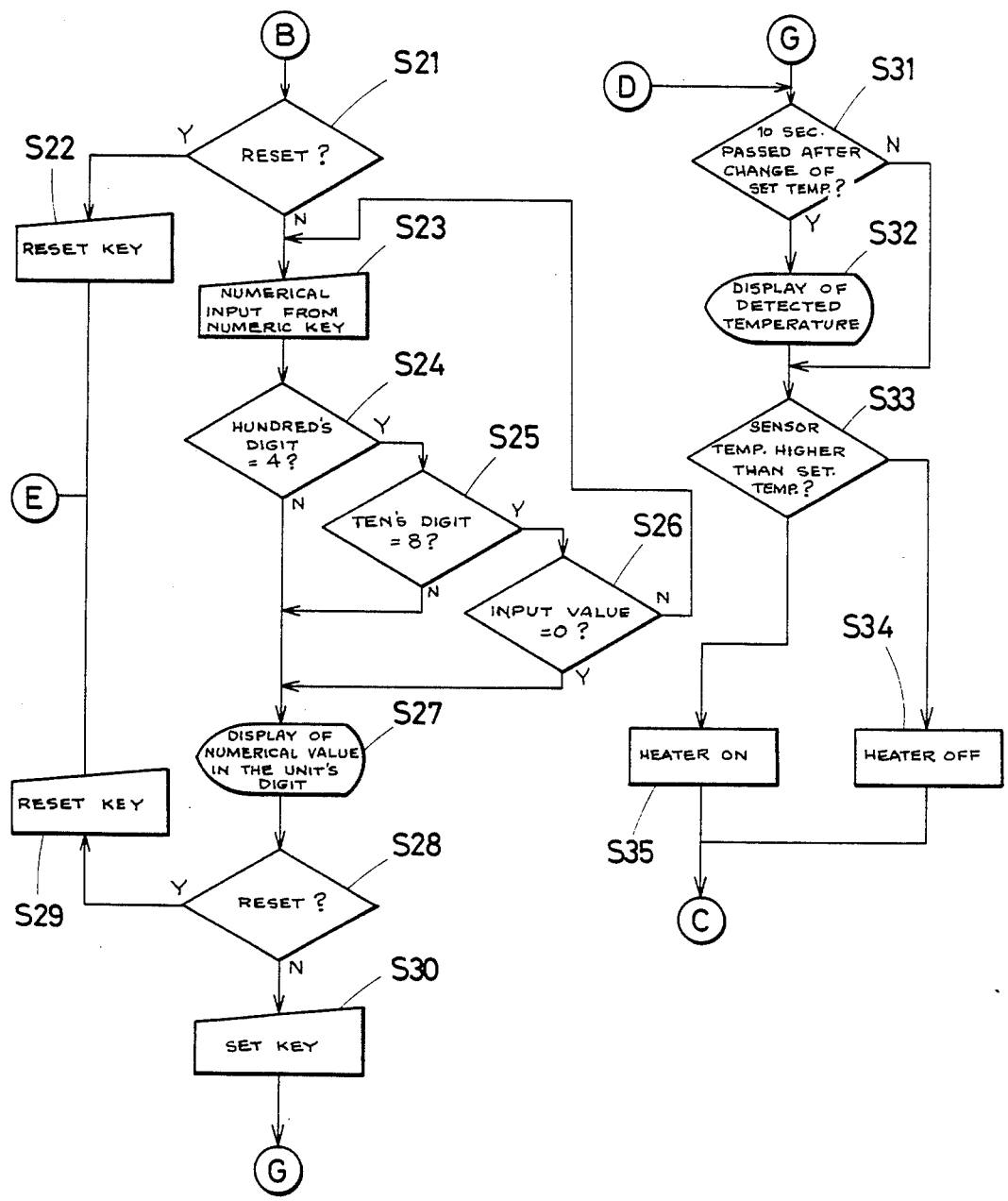
Figure 5:
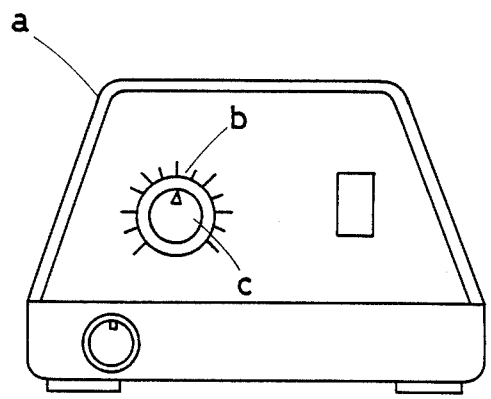
FIG. 5 is a front view showing a conventional soldering iron temperature control device.

The operation of changing setting temperature is described while referring to the flowcharts in FIG. 4a and FIG. 4b.

When the power switch 4 of the device main body 1 is turned on (S1), the present set temperature stored in the nonvolatile memory 11 is shown in the display window 5 (S2).

Then, whether or not to finish the soldering operation is judged (S3), and if YES, the operation is finished by turning off the power switch 4 (S4, 5).

If NO, the operation is continued, and whether or not to change the set temperature is judged (S6).

Next, relating to the present tip temperature, whether or not to permit change of setting is judged (S7). That is, whether the setting card is inserted in the card inlet 6 of the device main body 1 or not is judged. If YES, it is indicated that the setting card 3 is being inserted.

At this time, when the reset key 7c is pressed (S8), the former temperature stored in the nonvolatile memory 11 is cleared (S10).

On the other hand, if the permission of setting is NO, it means to wait for change of the set temperature of the ob now in progress.

To change the set temperature in this step, the specific setting operator inserts the setting card 3 into the card inlet 6 (S9). When the specific person is identified by the setting card 3 output of the numerical value entered from the numeric keys 7a is permitted. Hence, the former set temperature stored in the nonvolatile memory 11 is cleared, and the former temperature indicated on the display window 5 is also cleared (S10, 11).

In succession, a desired numerical value is entered from the numeric keys 7a, and a new temperature is determined (S12). In this embodiment, as stated above, the temperature setting is allowed only within a range of 100° C. to 480° C., and if the input value from the numeric keys 7s is within this range or not is judged.

That is, when a numerical value in the hundred's digit is entered in the first place, whether it is within 1 to 4 is judged by the set value judging part 13 (S13), and if NO, it means the value is out of the allowable setting range, and a correct value must be entered from a numeric key 7a (S12).

When judged to be YES, the input numeral not exceeding 4 is displayed in the hundred's place (S14).

At this time, if the input numerical value is cleared or not is judged (S15), and if YES, the reset key 7c is pressed (S16). As a result, the display is cleared (S11), and new numerical values are entered sequentially from the numeric keys 7a (S12).

If NO, on the other hand, a numerical value in the ten's digit is entered from the numeric key 7a (S17).

Then if the hundred's digit is 4 or not is judged (S18).

If YES, it is judged whether the input numerical value in the ten's digit is 9 or not (S19). If YES and the ten's digit is 9, it exceeds the allowable range of 8, and this numerical value input is disable led, and a correct numerical value input by numeric key 7a is required (S17). If NO, on the other hand, it means not to exceed the allowable range of 8, and the numerical value in the ten's digit is displayed (S20).

Meanwhile, if NO in step S18, it means within the setting range, and the numerical value in the ten's digit is also displayed (S20).

Here it is judged whether or not to reset the numerical values entered so far (S21). If necessary to reset, the reset key 7c is pressed (S22), so that all the entered numerical values are cleared (S11). As a result, returning to the beginning of temperature setting, a new numerical value is entered again (S12).

If NO, that is, not to reset, a numerical value in the unit's digit is entered from numeric key 7a (S23).

Consequently, whether the hundred's digit is 4 or not is judged (S24), and if NO, it is within setting range, and the numerical value in the unit's digit is displayed (S27). If YES, whether the ten's digit is 8 or not is judged (S25), and if NO, it is within setting range, and the numerical value in the unit's digit is displayed (S27), and if YES, whether the unit's digit is 0 or not is judged (S26). If YES, it is within setting range, and the numerical value in the unit's digit is displayed (S27). If NO, it exceeds the setting range upper limit of 480, it is not permitted as set value, and a correct numerical value is entered again from the numeric key 7a (S23).

Thus, after input of numerical value within the specified setting range, whether or not to reset this numerical value is judged (S28), and if YES, when the reset key 7c is pressed (S29), the display is cleared (S11), and new numerical values are sequentially entered from the numeric keys 7a (S12).

On the other hand, if NO and not to reset, when the set key 7b is pressed (S30), this input numerical value is set as a new set value, and is stored in the nonvolatile memory.

This newly entered numerical value is displayed for 10 seconds in the display window 5. In succession, it is judged whether 10 seconds have passed or not after change of the set temperature (S31).

If YES, 10 seconds have already passed, and the detected temperature by the temperature sensor 18 is displayed (S32).

If NO, whether the detected temperature is higher than the set temperature or not is judged (S33).

Meanwhile, after display of the detected temperature by the temperature sensor 18' (S32), the detected temperature and set temperature are thus compared (S33).

If YES at this time, the temperature of the heater 17 is higher than the set value, and the heater 17 is turned off (S34) to be controlled to the set temperature.

If NO, on the other hand, the temperature of the heater 17 is lower, and the heater 17 is turned on (S35) to be controlled to the set temperature.

In this way, when the set temperature is changed, the heating temperature of the heater 17 is automatically controlled depending on the temperature detected by the temperature sensor 18 to be corrected to be always at the set value. Therefore, the tip temperature of the soldering iron 2 is always kept at the optimum temperature.

Meanwhile, if the set temperature is not changed while continuing operation, the former temperature is maintained, and therefore the operation skips from step S6 to S31. At step S31, the temperature is not displayed because the setting is not changed, and the temperature control continues, and thereafter the temperature control cycle in the soldering operation is repeated.

Thus, according to this invention, when changing the set value of the tip temperature of the soldering iron, the numerical value cannot be entered unless the setting card is inserted into the card inlet of the device main body and the cardholder is identified to be the specific person, so that the setting operation may be allowed only for specific person such as qualified engineer, that is, change of setting of the heating temperature of the tip by other unauthorized persons can be prevented.

Besides, since the change of set temperature is allowed only within the predetermined upper and lower limits, and setting at higher temperature by misoperation or misjudgement may be prevented, too. Accordingly, the tip heating temperature is maintained at the optimum temperature for the electronic components to be soldered, and fluctuation or deterioration of product quality may be prevented.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changed which come within the meaning and range of equivalency of the claims are therefore intended to be embraced therein.

What is claimed is:

1. A soldering iron temperature control device capable of adjusting the set value of the temperature of a tip of a soldering iron having a heater for heating said tip, comprising:

card means having an identification code to identify a specific card holding person;

card identification means for identifying whether the card holding person is a selected person or not from the identification code of said card means and delivering a setting permit signal when the card holding person is identified to be the selected person;

input means for receiving the setting permit signal and entering the set value of said tip temperature;

set value judging means for judging whether the input numerical value from said input means is within an allowable temperature of the tip temperature or not;

memory means for storing the set value entered through said set value judging means;

temperature sensor means for detecting the tip temperature of the soldering iron;

comparative means for comparing the detected temperature of said temperature sensor means and the set value in said memory means; and temperature control means for delivering a control signal on the basis of the result of comparison by said comparative means and controlling the heating of the heater of the soldering iron in response to said control signal.

2. A soldering iron temperature control device according to claim 1, wherein temperature display means is also provided to indicate selectively the set value in said memory means or the detected temperature by said temperature sensor means.

3. A soldering iron temperature control device according to claim 1, wherein the identification code of said card means is composed of plural tiny holes penetrated in said card means, said card identification means comprises optical identification means disposed at the card inlet for inserting said card means, and said optical identification means is composed of projecting means for emitting light into tiny holes in said card means and detecting means for receiving the light transmitted through tiny holes.

4. A soldering iron temperature control device according to claim 1, wherein said input means is a keyboard comprising numeric keys.

5. A soldering iron temperature control device according to claim 1, wherein said memory means is a nonvolatile memory.

6. A soldering iron temperature control device according to claim 1, wherein said temperature sensor detects the temperature of said heater.

* * * * *